Dec. 19, 1922.
E. M. SMITH.
PUZZLE.
FILED FEB. 14, 1921.
1,439,336.
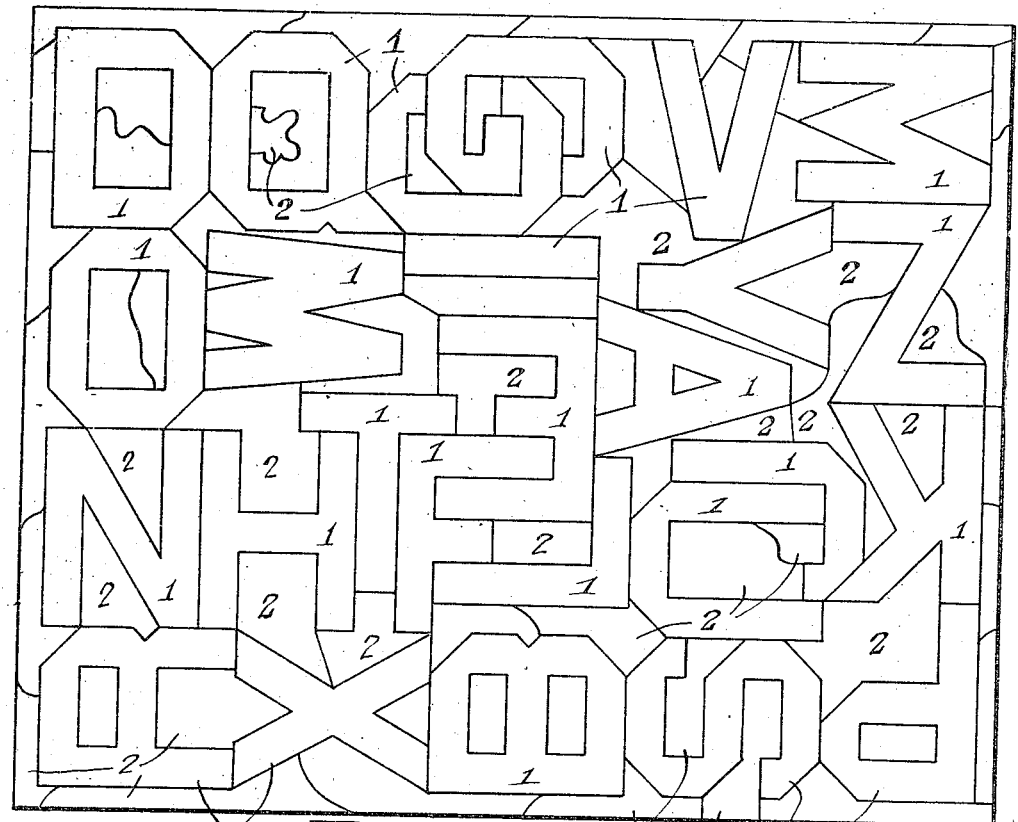
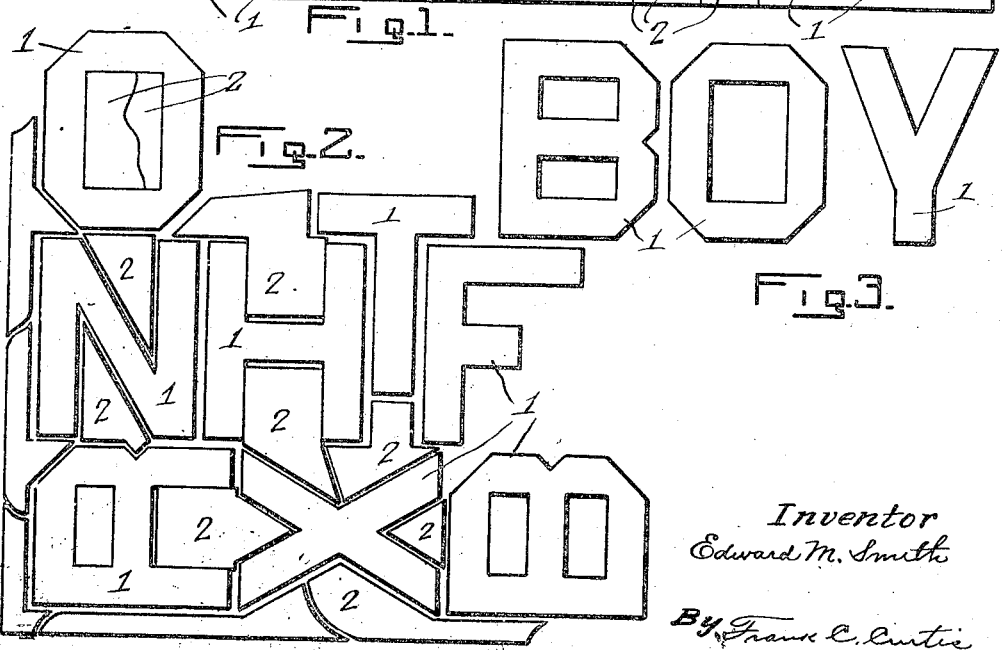
Inventor
Edward M. Smith
By Frank C. Curtis
Attorney Patented Dec. 19, 1922.

1,439,336

UNITED STATES PATENT OFFICE.

EDWARD M. SMITH, OF COHOES, NEW YORK.

PUZZLE.

Application filed February 14, 1921. Serial No. 444,644.

*To all whom it may concern:*

Be it known that I, EDWARD M. SMITH, a citizen of the United States, residing at Cohoes, in the county of Albany and State of New York, have invented new and useful Improvements in Puzzles, of which the following is a specification.

Reference may be had to the accompanying drawings, and the reference characters marked thereon, which form a part of this specification. Similar characters refer to similar parts in the several figures therein.

This invention relates to the type of puzzle comprising units of different shapes interfitting to form an area of given dimensions.

The principal object of the invention is to incorporate in such a puzzle complete characters of written speech which can be separated from other units of the puzzle and associated together to form various written forms of speech.

Fig. 1 of the drawings is a plan view of a puzzle embodying my invention.

Fig. 2 is a similar view of a corner portion of the puzzle with the units more or less separated from one another.

Fig. 3 is a view showing three of the alphabetical characters separated from the other units of the puzzle and assembled to spell a simple word.

Referring to the drawings wherein the invention is shown in preferred form, the puzzle comprises a set of units, 1, forming each a complete character of written speech, and another set of units, 2, the units of the two sets fitting as shown in Fig. 1 to form a rectangular area.

The form and dimensions of this area may be varied as desired in embodying the invention in puzzles of different kinds. So also the form and dimensions of the units may be varied at will in embodying the invention in puzzles employing different styles of characters of written speech.

For certain purposes of the invention it is immaterial whether the characters of written speech be alphabetical, numerical or of other form provided the several characters are complete and associable with others of said characters to form various written forms of speech.

In the drawings I have shown the characters of written speech as letters of the alphabet formed throughout with straight lines, whereby the letter character units can be interfitted more or less one with another.

A more intricate puzzle might be made by using letter character units of different design. As shown in Fig. 1, these letter character units, 1, are interfitted with one another and also with the units, 2, to form the complete area of given dimensions, said area being in the form of a quadrangle.

The puzzle can be readily broken up and reassembled.

By breaking up the puzzle the letter character units are accessible for use in association with one another to spell out various words; and in Fig. 3, I have shown three of said characters associated together to spell the word "Boy."

The puzzle thus affords an interesting and instructive game for a child in assembling the letter character units to spell out different words; and it also forms an interesting puzzle in the fitting together of the two sets of units to form the given area.

As shown in Fig. 1, the spaces between neighboring letter character units are filled by certain of the other units, 2, interfitting with the letter character units.

The several units, 1 and 2, may be formed in any known manner as by cutting, stamping or molding them out of suitable material.

What I claim as new and desire to secure by Letters Patent is:

1. A puzzle comprising units interfitting to form an area of given dimensions, certain of said units forming each a complete character of written speech interchangeably associable with others of said certain units to form various written forms of speech.

2. A puzzle comprising units in the form of different alphabetical characters each complete in itself, and other units interfitting therewith to form an area of given dimensions.

In testimony whereof, I have hereunto set my hand this 5th day of February, 1920.

EDWARD M. SMITH.